United States Patent [19]
Nakamura

[11] Patent Number: 5,923,732
[45] Date of Patent: Jul. 13, 1999

[54] TALKIE CONNECTION APPARATUS AND METHOD FOR USE IN A SWITCHED NETWORK SYSTEM

[75] Inventor: Toshio Nakamura, Tokyo, Japan

[73] Assignee: NEC Corporation, Tokyo, Japan

[21] Appl. No.: 08/759,833

[22] Filed: Dec. 4, 1996

[30] Foreign Application Priority Data

Dec. 4, 1995 [JP] Japan ................................. 7-315172

[51] Int. Cl.⁶ ................................................. H04M 1/64
[52] U.S. Cl. ...................................... 379/88.18; 379/213
[58] Field of Search ........................... 379/88.18, 88.22, 379/88.25, 120, 201, 207, 213, 218, 223, 308, 320, 321

[56] References Cited

U.S. PATENT DOCUMENTS 4,256,928  3/1981  Lesea et al. .
4,629,831  12/1986  Curtin et al. ............................. 379/213
4,782,509  11/1988  Shepard ..................................... 379/88
4,975,941  12/1990  Morganstein et al. .................... 379/88
5,771,279  6/1998  Cheston, III et al. ................ 379/93.17

FOREIGN PATENT DOCUMENTS 1-137762  5/1989  Japan .

Primary Examiner—Scott Weaver
Attorney, Agent, or Firm—Foley & Lardner

[57] ABSTRACT

In a talkie connecting apparatus and method between switchboards, each switchboard is provided with a talkie type memory for storing as fixed information the type number of a talkie device mounted in a switchboard, and when a talkie guide is required to be performed for a calling terminal in a connection process of connecting the calling terminal to a called terminal through plural switchboards, an adjustment is performed between the switchboards so that the nearest switchboard to the calling terminal performs the talkie connection. Accordingly, the talkie guide can be performed by using no line between the switchboards.

12 Claims, 3 Drawing Sheets

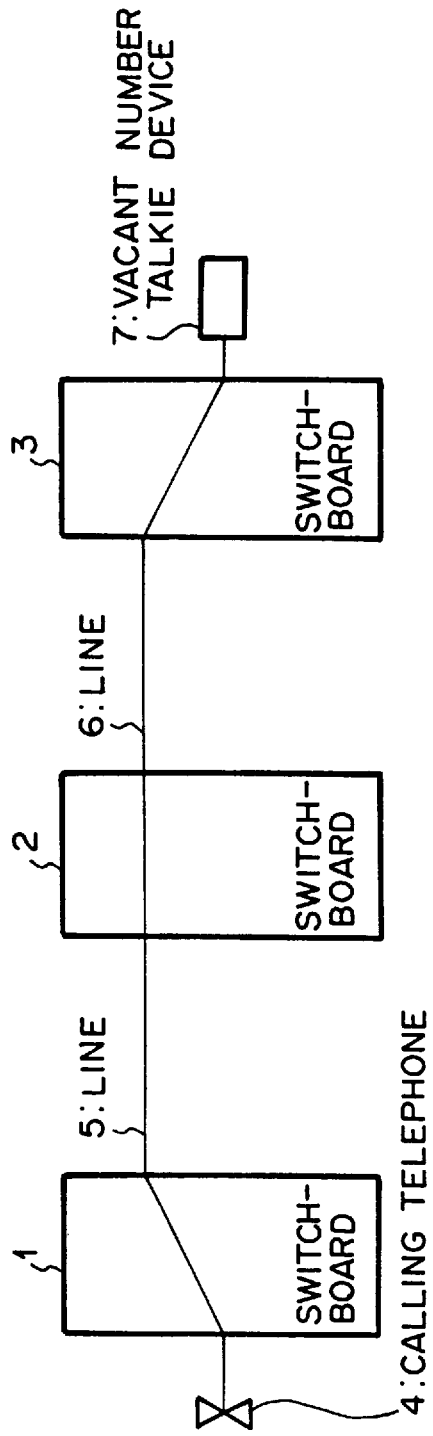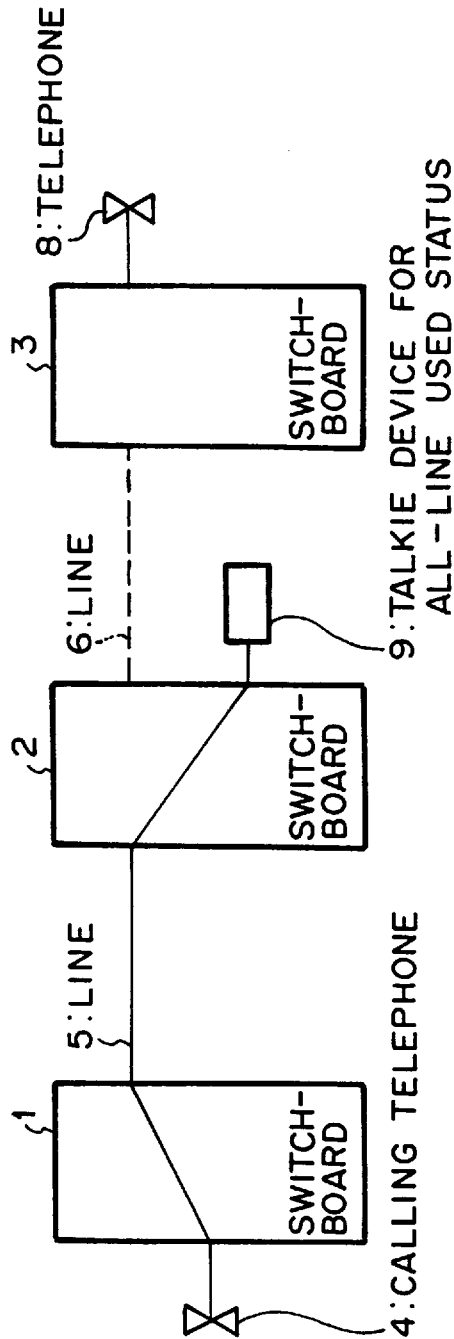

TALKIE CONNECTION APPARATUS AND METHOD FOR USE IN A SWITCHED NETWORK SYSTEM

BACKGROUND OF THE INVENTION

1. Field of the Invention

The present invention relates to a connection technique for a talkie device of a switchboard, and particularly to an apparatus and a method for a talkie connection between centrals (switchboards) when a network is constructed by plural switchboards.

2. Description of Related Art

When a connection between a calling terminal and a called terminal is made impossible due to some trouble in such a connection process that the calling terminal (caller) is connected to the called terminal (callee) through plural switchboards, there has been hitherto adopted a method that a switchboard causing the trouble acts to connect a talkie device i.e., a message generator, thereof to the calling terminal so that an audio is performed (e.g., a talkie guide message is played) to the calling terminal.

Specifically, as shown in FIG. 3A, when a telephone 4 serving as the calling terminal makes a dial calling to call (connect) another telephone which belongs to a switchboard 3, the telephone 4 transmits dial information through a switchboard 1, a line 5, a switchboard 2 and a line 6 to the switchboard 3. At this time, if the called telephone corresponding to the dial information does not exist in the switchboard 3, the switchboard 3 connects the line 6 to a vacant number talkie device 7 so that a message "the dialed number is not used at present" is output from the talkie device 7 to the calling telephone 4.

Furthermore, as shown in FIG. 3B, when the telephone 4 makes a dial calling to call a telephone 8 which belongs to the switchboard 3, if all the lines 6 between the switchboard 2 and the switchboard 3 are being used, the switchboard 2 connects the line 5 to a talkie device 9 which is used for such a situation that all lines are used (hereinafter referred to as "talkie device under all-used status"), so that a message "the line is crowed at present, and please call back later" is output from the talkie device 9 to the calling telephone 4.

In the conventional connection system using the talkie devices as described above, many lines between switchboards (i.e., centrals) are in use for a time when a caller hears a talkie guide message at the calling terminal side. Accordingly, even when another terminal needs one of the lines to make a call, the terminal encounters the all-used status at high probability.

Furthermore, when there occurs a cause to give a talkie guide to a calling terminal side during a process of connecting the calling terminal to a called terminal through plural switchboards and when all the talkie devices are being used (i.e., under all-used status) or no talkie device is provided, only a busy signal (sound) or a regulation sound is merely given to the calling terminal side, and no talkie guide is given to the calling terminal side. Therefore, the service quality for users is low.

SUMMARY OF THE INVENTION

Therefore, an object of the present invention is to provide an inter-central connection apparatus and method which can surely give a talkie guide to a calling terminal when there occurs a cause to give the talkie guide to the calling terminal side, and enhance a line using efficiency when the talkie guide is given.

In order to attain the above object, an inter-central connecting apparatus and method for use in a switched network system in which plural switchboards are successively connected to one another, is characterized in that a talkie type memory for storing as fixed information the type number of a talkie device mounted in a switchboard is provided to each switchboard. A switchboard which is nearest to a calling terminal performs a talkie connection (guide) when the talkie guide is required to be given to the calling terminal in a process of connecting the calling terminal to a called terminal through plural switchboards. As a result, the talkie guide (e.g., a talkie guide message) is given without the use of any line between centrals (switchboards), and thus the probability that the line encounters an all-used status can be reduced, so that the line using efficiency can be enhanced.

In the apparatus and method as described above, the talkie type memory may be provided with a mount data area for setting a mount status of the talkie device (i.e., whether the talkie device is mounted or not) in connection with the talkie type number. In this case, when a talkie guide is required to be given to the calling terminal, another switchboard which is secondly nearest to the calling terminal is controlled to perform the talkie connection (guide) if no talkie device is mounted in the nearest switchboard. As a result, even when the switchboard concerned has no talkie device, the talkie guide is given to the calling terminal by another switchboard, so that the service quality can be enhanced.

Furthermore, in the apparatus and method as described above, the talkie type memory may be provided with an all-use data area for setting an use status of the talkie device (i.e., whether the talkie device is used or not) in connection with the talkie type number. In this case, when a talkie guide is required to be given to the calling terminal, another switchboard which is secondly nearest to the calling terminal is controlled to perform the talkie connection (guide) if the talkie device mounted in the nearest switchboard is in use. As a result, the talkie guide can be given from another switchboard even when the talkie device of the switchboard concerned is in an all-used status, so that the service quality can be improved.

Still furthermore, in the apparatus and method as described above, the data of the talkie type memory of a switchboard may be composed of the talkie type number of a talkie device mounted in a switchboard which is just preceding to the switchboard concerned and is nearer to the calling terminal, and mount data representing a mount status of the talkie device of the just-preceding switchboard. In this case, a switchboard which has a cause to give a talkie guide to the calling terminal refers to the talkie type memory to transmit a talkie connection request to the just preceding switchboard so that the just preceding switchboard performs a talkie connection if a desired talkie device is mounted in the just preceding switchboard. As a result, it is unnecessary to provide the talkie device to the switchboard concerned, and the line is cut off just after the talkie connection request is transmitted, whereby the line is allowed to be usable by another terminal.

BRIEF DESCRIPTION OF THE DRAWINGS

FIGS. 3A and 3B are diagrams showing examples of a talkie connection of a conventional system.

DETAILED DESCRIPTION OF THE PREFERRED EMBODIMENT

A preferred embodiment according to the present invention will be described hereunder with reference to the accompanying drawings.

Figure 1:
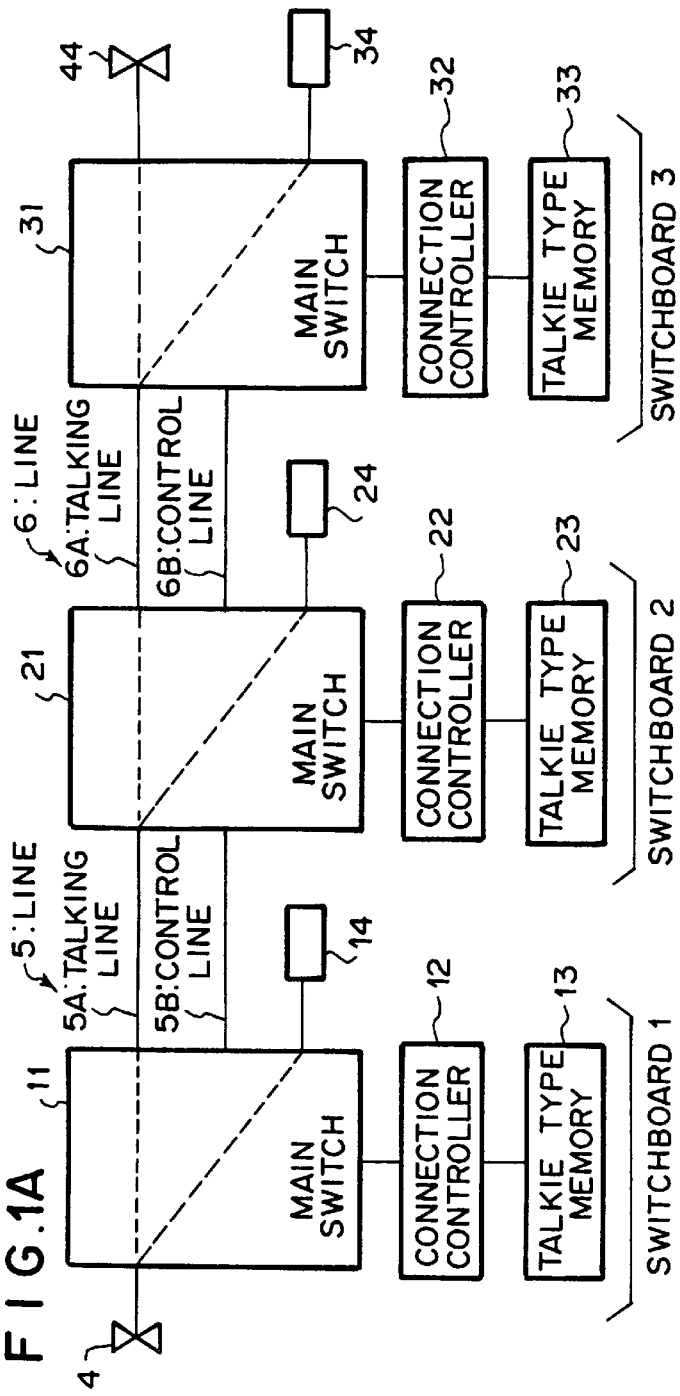
FIG. 1A is a block diagram showing the construction of a switched network system to which the present invention is applied.
FIG. 1B is a table showing the structure of a talkie type memory which is provided to each switchboard.

FIG. 1A is a block diagram showing the construction of a switched network system to which the present invention is applied.

The network system according to an embodiment of the present invention comprises three switchboards 1 to 3, and each of the switchboards 1 to 3 is provided with a main switch 11 (21, 31), a connection controller 12 (22, 32) and a talkie type memory 13 (23, 33). Further, a vacant number talkie device 14 (24, 34) is connected to each main switch 11 (21, 31) of each switchboard 1 (2,3).

Each main switch 11, 21, 31 performs a mutual connection between a telephone 4 and a line, between a vacant talkie device and a line and between lines under control of each connection controller 12, 22, 32. Further, the switchboards 1, 2 and 3 are connected to one another through the main switches 11, 21 and 31 and the lines 5 and 6, and each line 5 (6) comprises a talking line 5A (6A) for performing a mutual talking or a talkie guide, and a control line 5B (6B) for performing transmission and reception of a control signal between the switchboards.

In the above-described embodiment, the network system is designed to have the three switchboards which are connected to one another in series, and this structure is given to make the understanding of the present invention clear, and thus various modifications may be made to this embodiment. In a practical use, each of an end outlet (EO), a toll center (TC), a district center (DC), a regional center (RC), zone center (ZC) and so on corresponds to a switchboard in a four-stage hierarchical network of a Japanese telephone network, for example.

Each connection controller 12 (22, 32) controls the corresponding main switch on the basis of the dial information received through the telephone 4 or the control line 5B or 6B by using a program or data stored therein to perform switch processing such as connection/cutoff, etc. The talkie type memory 13 (23, 33) is used to unify talkie type information which is received and transmitted between the switchboards.

Here, as shown in FIG. 1B, the talkie type number is stored as fixed information (for example, "1" represents a vacant number talkie (device), "2" represents an all-line used status talkie (device)) in the talkie type memory 13 (23, 33), and the mount data (mounted/demounted) and all-under-use data (vacancy/no-vacancy) can be registered in connection with the talkie type number at any time. When a maintainer of switchboards installs talkie devices in the switchboards, the mount data corresponding to a talkie type number concerned is registered as "mounted". Further, when all the corresponding talkie devices are connected and used, the all-use data is registered as "no-vacancy" by an instruction of the connection controller 12 (22, 32).

Figure 2:
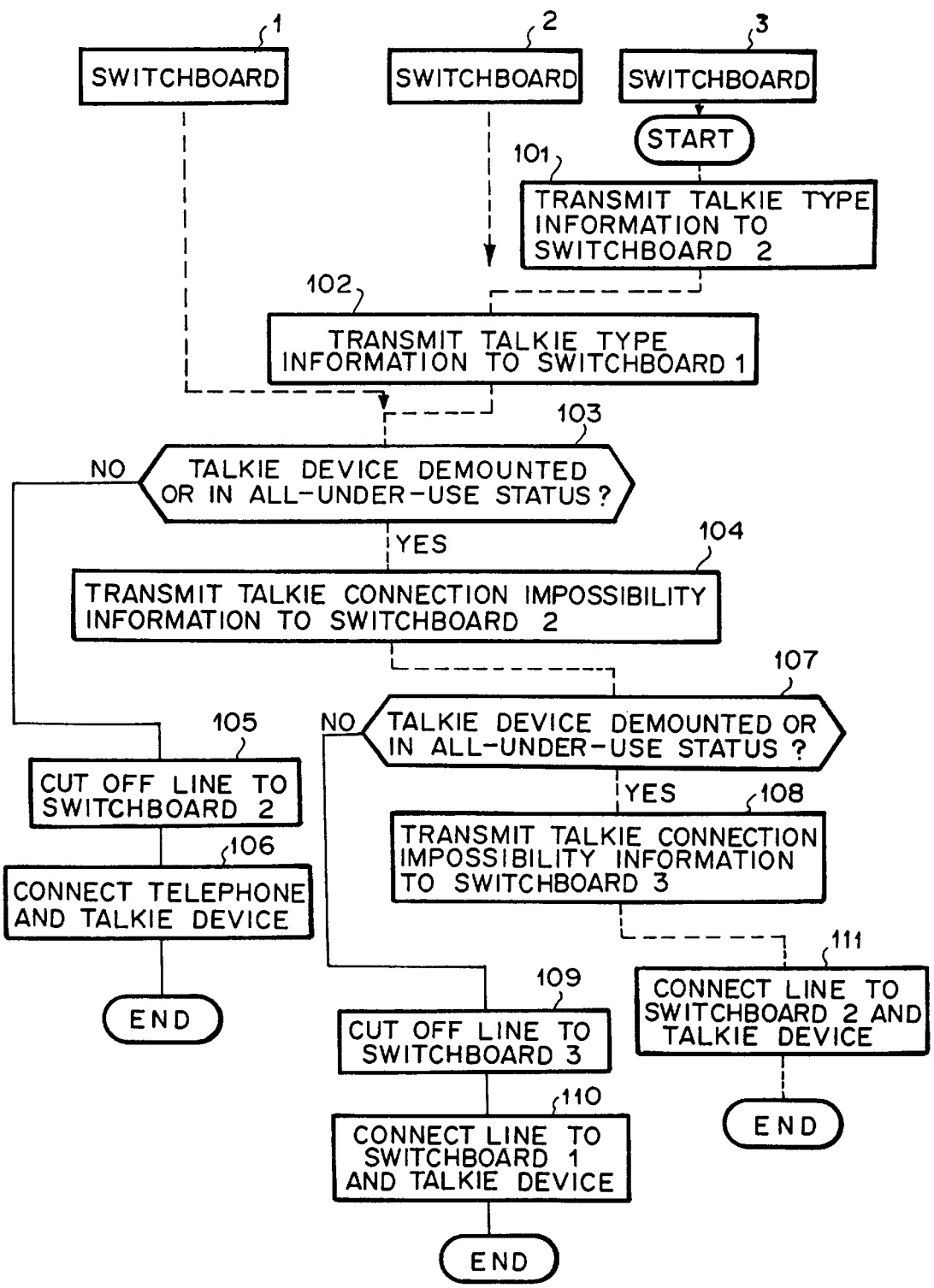
FIG. 2 is a flowchart showing the operation of a main part of the present invention.

Next, the operation of the switched network system thus constructed will be described with reference to the flowchart of FIG. 2.

First, when a dial calling operation to call a telephone belonging to the switchboard 3 is carried out at the telephone 4 which is connected to the switchboard 1, the lines 5 and 6 are captured to transmit the dial information through the control lines 5B and 6B to the switchboard 3. In this case, it is assumed that a telephone 44 is connected to the switchboard 3 and it is a dialed target. If the telephone 44 is unused, the connection controller 32 controls the main switch 31 to connect to the telephone 44. Further, if the connection controller 32 of the switchboard 3 judges that the called telephone corresponding to the dial information does not exist when the connection controller 32 receives the dial information, the connection controller 32 transmits the talkie type information (in this case, the talkie type number "1") through the control line 6B to the switchboard 2 (step 101).

When receiving the talkie type information from the switchboard 3, the connection controller 22 of the switchboard 2 transmits the talkie type information through the control line 5B to the switchboard 1 (step 102). Upon receiving the talkie type information from the switchboard 2, the connection controller 12 of the switchboard 1 reads out the content of the talkie type memory 13, and judges on the basis of the mount data and the all-under-use data corresponding to the talkie type number "1" whether the vacant number talkie device 14 is mounted in the switchboard of the connection controller 12 (i.e., the switchboard 1) and whether the vacant number talkie device 14 of the switchboard of the controller 12 (i.e., the switchboard 1) is vacant (step 103). If there is any unoccupied vacant number talkie device, the pass between the line 5 and the telephone 4 which is captured to connect to the switchboard 2 is cut off, and the line 5 itself is cut off to thereby release the captured status (step 105). At this time, the line 6 is also cut off by the switchboard 2.

Subsequently, the connection controller 12 controls the main switch 11 to establish a pass between the vacant number talkie device 14 and the telephone 4, and gives the talkie guide (a talkie guide message, for example, "the dialed number is not used at present") from the talkie device 14. In this case, if the connection controller 32 of the switchboard 3 judges that the called telephone corresponding to the dial information cannot be connected because all lines are in use, the talkie device 14 gives the calling telephone 4 a message "the line is crowded at present, and please call back later". (step 106).

When the telephone 4 calls a telephone belonging to the switchboard 3, but the calling is impossible as described above, the lines 5 and 6 are respectively cut off, and the talkie guide is given from the switchboard 1 containing the telephone 4 which is a calling terminal. Therefore, the lines between the centrals (switchboards) which are used for the talkie guide are not required, and thus these lines can be used for other purposes. That is, the talkie guide is given from the switchboard 1 which is nearest to the calling terminal, and thus the number of lines to be used for the talkie guide is equal to zero, so that the line using efficiency can be more enhanced.

In this case, if the talkie device 14 is not mounted or is in the all-under-use state in the switchboard 1 ("YES" in step 103), the talkie type information and the talkie connection impossibility information are transmitted through the control line 5B to the switchboard 2 (step 104). Upon receiving the talkie type information and the talkie connection impossibility information, the connection controller 22 of the switchboard 2 reads out the content of the talkie type memory 23, and judges on the basis of the mount data and the all-under-use data corresponding to the talkie type number "1" whether the vacant number talkie device 24 is mounted in the switchboard thereof (i.e., the switchboard 2) and whether the vacant number talkie device 24 of the switchboard 2 thereof (i.e, the switchboard 2) is vacant (step 107).

If there is any unoccupied vacant number talkie device 24, the pass between the lines 6 and 5 which is captured to connect to the switchboard 3 is cut off and the line 6 is also cut off to release the captured state (step 109). Subsequently, the connection controller 22 establishes a pass between the vacant number talkie device 24 and the talking line 5A of the line 5 to give the talkie guide to the telephone 4 through the line 5 and the switchboard 1 (step 110). Consequently, the talkie guide can be given by using only the line 5 which is contained in the lines between the centrals (switchboards) and indispensable for the talkie guide, resulting in reduction in the probability that another terminal encounters such a situation that all the lines are used when the terminal needs a line to call.

Here, when the talkie device 24 is not mounted or in the all-under-use status in the switchboard 2 ("YES" in step 107), the talkie type information and the talkie connection impossibility information are transmitted to the switchboard 3 through the control line 6B (step 108). Upon receiving the talkie type information and the talkie connection impossibility information, the connection controller 32 of the switchboard 3 establishes a pass between the vacant number talkie device 34 and the talking line 6A of the line 6 to give the talkie guide to the telephone 4 through the line 6, the switchboard 2, the line 5 and the switchboard 1 (step 111).

In the embodiment as described above, each of the switchboards 1 to 3 is provided with only the talkie type memory which comprises the talkie type number, the mount data and the all-under-use data of its switchboard. However, each switchboard may be designed to have the talkie type memory (a memory having a talkie number and mount data) of another switchboard. In this case, when a switchboard has a cause to give the talkie guide (talkie guide message) to a calling terminal, the switchboard concerned refers to the talkie type memory of a just-preceding switchboard which is located just prior to the switchboard concerned and nearer to the calling terminal than the switchboard concerned. If the just-preceding switchboard is judged to have a desired talkie device mounted therein, the switchboard concerned transmits a talkie connection request to the just-preceding switchboard, and then immediately cuts off the line with the just-preceding switchboard.

In this modification, when the several talkie devices of the just-preceding switchboard are in the all-use status, the talkie guide cannot be given from the switchboard concerned, however, the purpose of "reducing the number of lines to be used for the talkie guide by giving the talkie guide from the switchboard which is nearest to the calling terminal" can be satisfied.

As described above, each of the switchboards 1 to 3 which construct the network is provided with the talkie type memory for storing the type number of the talkie device as fixed information, and also provided with a talkie connection adjusting means for adjusting the connection between the switchboards so that the switchboard nearest to a calling terminal is connected to the calling terminal when the talkie guide to the calling terminal is required in the connection process of connecting the calling terminal to a called terminal through plural switchboards, whereby the talkie guide can be performed with no line between centrals (switchboards). Therefore, the probability that a line encounters the all-under-use status is reduced, and thus the line using efficiency can be enhanced. Furthermore, the number of lines can be reduced, and thus an equipment cost can be reduced.

Furthermore, even when the several talkie devices of the switchboard concerned are in the all-under-use status, the talkie guide can be performed from another switchboard if a talkie device is mounted in the switchboard, so that the service quality can be enhanced. In addition, even when the switchboard concerned has no talkie device, if another switchboard has a talkie device, the talkie guide can be performed from the switchboard, so that the service quality can be also enhanced.

Still furthermore, in such a situation that a repeating line is in the all-under-use state when a calling from a preceding switchboard is relayed in a repeating switchboard which has no terminal and merely performs a repeating switching operation, the talkie guide is allowed by using the talkie device (talkie device for all-line use status) of the preceding switchboard. Therefore, it is unnecessary to mount the talkie device in the repeating switchboard.

As described above, according to the present invention, each switchboard is provided with the talkie type memory for storing as fixed information the type number of the talkie device mounted in the switchboard, and when the talkie guide is required to be supplied to a calling terminal in the process of connecting the calling terminal to a called terminal through plural switchboards, the switchboard which is nearest to the calling terminal is controlled to perform the talkie guide to the calling terminal. Therefore, the talkie guide can be performed by using no line between centrals (switchboards). Accordingly, the probability that a line encounters the all-under-use status is reduced, and thus the line using efficiency can be enhanced. Further, since the number of lines between centrals can be reduced, the equipment cost can be reduced.

Furthermore, the talkie type memory is provided with the mount data area for setting the mount status of the talkie device in connection with the type number. In this case, in the case where the talkie device is not mounted in the switchboard nearest to the calling terminal when the talkie guide for the calling terminal is required, another switchboard is controlled to perform the talkie connection (guide). Therefore, even when no talkie device is mounted in the switchboard concerned, the talkie guide can be performed, and thus the service quality can be enhanced.

Still furthermore, in a repeating switchboard which has no terminal and performs only the repeating switching operation, when all the repeating lines are used, the talkie guide can be performed by using the talkie device of a preceding switchboard. Accordingly, no talkie device is required for the repeating switchboard.

Still furthermore, the talkie type memory is provided with the all-under-use data area for setting the using status of the talkie device in connection with the type number. In the case where the talkie guide for the calling terminal is required, if the talkie device mounted in the switchboard nearest to the calling terminal is used, another switchboard is controlled to perform the talkie connection (guide). Therefore, even when the talkie device of the switchboard concerned is in the all-under-use status, the talkie guide can be performed by another switchboard, so that the service quality can be enhanced.

Still furthermore, the data of the talkie type memory is composed of the type number of the talkie device mounted in the preceding switchboard which is located just prior to the switchboard concerned and is nearer to the calling terminal than the switchboard concerned, and the mount data representing the mount status of the talkie device (i.e., whether the talkie device is mounted or not). A switchboard which has a cause to perform the talkie guide for the calling terminal refers to the talkie type memory, and if the preceding talkie device has a desired talkie device, the switchboard concerned transmits a talkie connection request to the preceding talkie device to perform the talkie connection (guide). Therefore, no talkie device is required to be equipped in the switchboard concerned, and the switchboard concerned can quickly give a line to another terminal by cutting off the line immediately after it transmits the talkie connection request.

While this invention has been particularly shown and described with reference to the preferred embodiment thereof, it will be understood that various changes in form and details may be made therein without departing from the spirit and scope of the invention.

What is claimed is:

1. An inter-central connecting system in a switched network system comprising:

plural switchboards for connecting a calling terminal to a called terminal, said plural switchboards successively connected to one another, each of said plural switchboards being provided with at least one talkie device and a talkie type memory for storing as fixed information a type number of said at least one talkie device mounted in said each switchboard, wherein, when a talkie connection is required between the calling terminal and the called terminal so as to provide a talkie guide to the calling terminal, a nearest switchboard to the calling terminal is controlled to perform the talkie connection between the calling terminal and the called terminal.

2. The system as claimed in claim 1, wherein said talkie type memory is provided with a mount data area for storing a talkie device mount status for said at least one talkie device in association with the type number, and, when a talkie connection is required between the calling terminal and the called terminal so as to provide a talkie guide to the calling terminal and no talkie device is mounted in said nearest switchboard, another switchboard that is secondly nearest to the calling terminal is controlled to perform the talkie connection between the calling terminal and the called terminal.

3. The system as claimed in claim 1, wherein said talkie type memory is provided with an all-under-use data area for storing a using status of said talkie device in association with the type number, and, when a talkie connection is required between the calling terminal and the called terminal so as to provide a talkie guide to the calling terminal and the talkie device mounted in the nearest switchboard is in use, another switchboard that is secondly nearest to the calling terminal is controlled to perform the talkie connection between the calling terminal and the called terminal.

4. The system as claimed in claim 1, wherein said talkie type memory of a first switchboard includes the type number of a talkie device mounted in a second switchboard that just precedes said first switchboard and that is nearer to the calling terminal than said first switchboard, said talkie type memory of said first switchboard also includes mount data representing a mount status of said talkie device of said second switchboard, and wherein when said first switchboard needs to provide a talkie guide to the calling terminal, said first switchboard refers to said talkie type memory of said second switchboard and, if said second switchboard has a desired talkie device corresponding to said necessary talkie guide, transmits a talkie connection request to said second switchboard so that said second switchboard performs the talkie connection.

5. The system as claimed in claim 1, wherein each of said plural switchboards comprises a main switch for establish-ing mutual connection between the calling terminal and a line, between a vacant number talkie device and a line, and between lines, each of said plural switchboards also comprising a connection controller for controlling the mutual connection of said main switch.

6. The system as claimed in claim 1, wherein said talkie type memory includes a table containing talkie type numbers, mount data representing whether said talkie type numbers are mounted, and all-under-use data representing whether all-under-use status applies.

7. An inter-central connecting method for use in a switched network system, comprising the steps of:

connecting plural switchboards together successively, each of said plural switchboards having at least one talkie device and a talkie type memory for storing as fixed information a type number of said at least one talkie device mounted in said each switchboard;

connecting a calling terminal to a called terminal through said plural switchboards; and when a talkie connection is required for the connection of the calling terminal to the called terminal so as to provide a talkie guide to the calling terminal, controlling a switchboard nearest to the calling terminal to perform the talkie connection.

8. The method as claimed in claim 7, further comprising the steps of:

providing said talkie type memory with a mount data area for storing a talkie device mount status for said at least one talkie device in association with the type number, and when a talkie connection is required between the calling terminal and the called terminal so as to provide a talkie guide to the calling terminal, and no talkie device is mounted in said nearest switchboard, controlling another switchboard that is secondly nearest to the calling terminal to perform the talkie connection between the calling terminal and the called terminal.

9. The method as claimed in claim 7, further comprising the steps of:

providing said talkie type memory with an all-under-use data area for storing a using status of said talkie device in association with the type number, and when a talkie connection is required between the calling terminal and the called terminal so as to provide a talkie guide to the calling terminal, and the talkie device mounted in the nearest switchboard is in use, controlling another switchboard that is secondly nearest to the calling terminal to perform the talkie connection between the calling terminal and the called terminal.

10. The method as claimed in claim 7, further comprising the steps of:

storing, in said talkie type memory of a first switchboard, the type number of a talkie device mounted in a second switchboard that just precedes said first switchboard and that is nearer to the calling terminal than the first switchboard, storing, in said talkie type memory of said first switchboard, mount data representing a mount status of said talkie device of said second switchboard, and when said first switchboard needs to provide a talkie guide to the calling terminal, referring said first switchboard to said talkie type memory of said second switchboard and, if said second switchboard has a desired talkie device corresponding to said necessary talkie guide, transmitting a talkie connection request to said second switchboard so that said second switchboard performs the talkie connection.

11. The method as claimed in claim 7, further comprising the steps of:

providing, in each of said plural switchboards, a main switch for establishing mutual connection between the calling terminal and a line, between a vacant number talkie device and a line, and between lines, and providing, in each of said plural switchboards, a connection controller for controlling the mutual connection of said main switch.

12. The method as claimed in claim 7, further comprising the steps of:

providing, in said talkie type memory, a table containing talkie type numbers, mount data representing whether said talkie type numbers are mounted, and all-under-use data representing whether all-under-use status applies.

* * * * *